(12) United States Patent
Bianchi

(10) Patent No.: US 9,517,736 B2
(45) Date of Patent: Dec. 13, 2016

(54) STACKABLE AUTOMOTIVE WATER SHIELDS INCLUDING A CHANNEL WITH INWARDLY ANGLED WALLS CONTAINING AN ADHESIVE

(71) Applicant: Unique Fabricating, Inc., Auburn Hills, MI (US)

(72) Inventor: Daniel Bianchi, Auburn Hills, MI (US)

(73) Assignee: UNIQUE FABRICATING, INC., Auburn Hills, MI (US)

( * ) Notice: Subject to any disclaimer, the term of this patent is extended or adjusted under 35 U.S.C. 154(b) by 0 days.

(21) Appl. No.: 14/663,743

(22) Filed: Mar. 20, 2015

(65) Prior Publication Data
US 2016/0272128 A1    Sep. 22, 2016

(51) Int. Cl.
*B60R 13/08* (2006.01)
*B62D 65/06* (2006.01)
*B32B 37/12* (2006.01)
*B32B 41/00* (2006.01)

(52) U.S. Cl.
CPC ....... *B60R 13/0892* (2013.01); *B32B 37/1292* (2013.01); *B32B 41/00* (2013.01); *B62D 65/06* (2013.01); *B32B 2307/7265* (2013.01); *B32B 2605/00* (2013.01); *B32B 2607/00* (2013.01); *B60R 2013/0807* (2013.01)

(58) Field of Classification Search
CPC ............... B60R 13/0892; B60R 2013/0807; B62D 65/06; B32B 37/1292; B32B 41/00; B32B 2307/7265; B32B 2607/00; B32B 2605/00
USPC ............................... 428/40.1; 296/191, 39.1
See application file for complete search history.

(56) References Cited

U.S. PATENT DOCUMENTS

| 2,974,078 | A | * | 3/1961 | Petritz | B60R 13/02 156/314 |
| 5,322,722 | A | * | 6/1994 | Rozenberg | B60J 5/042 296/191 |
| 6,092,854 | A | * | 7/2000 | Campbell | B60R 13/02 180/90 |
| 6,541,098 | B2 | * | 4/2003 | Venkatasanthanam et al. | B29C 47/0021 156/244.15 |
| 2003/0221770 | A1 | * | 12/2003 | Meixner | C09J 7/00 156/230 |

* cited by examiner

*Primary Examiner* — Brent W Herring
(74) *Attorney, Agent, or Firm* — Linda D. Kennedy; Bill C. Pangos; Butzel Long, P.C.

(57) ABSTRACT

A stackable water shield comprising a body portion having a width and length and thickness, said body having a wet surface, said body further having a channel formed between inwardly angled walls in a portion of the body, said channel having a width and a depth sufficient to accept a sufficient amount of glue, said glue amount not extending to the wet surface of the water shield, said water shields stackable without interposing a glue protective barrier such as a release sheet between said stacked water shields.

2 Claims, 2 Drawing Sheets

STACKABLE AUTOMOTIVE WATER SHIELDS INCLUDING A CHANNEL WITH INWARDLY ANGLED WALLS CONTAINING AN ADHESIVE

BACKGROUND

Manufacturing processes for automotive door assemblies can be labor intensive, and may involve multiple steps in order to produce a door panel that is aesthetically pleasing, functionally sound, and protects an automobile from water intrusion.

Generally, an automotive door assembly will include a water shield, which is a sheet of water proof or at least water resistant material that is interposed between the metal door structure and the aesthetic door panel so that water entering the door area during vehicle operation will not be transmitted to the composite door panels and thereby damage the look or feel of the door panel.

In certain previous door assemblies, a water resistant or water proof barrier that is the water shield is transported to a factory or assembly area in stacks with glue pre-applied in the appropriate places on one side of the water shield, and separated from the next water shield in the stack by a removable membrane of release material to protect the glue from sticking to the water shield next to it on the stack. In order to affix the water shield to the door, a worker takes the water shield, removes the protective glue shield release material, sticks the water shield to the door, and then assembles the door panel to the vehicle door. The glue shield release material is waste material that must be removed from the assembly floor work area on a fairly regular basis, or the work area could be overrun with scrap material, thereby making continued assembly difficult.

There is a need for an improved automotive water shield that may be pre-glued and stackable to eliminate waste materials from accumulating on the assembly floor area and to avoid one stacked water shield from slipping into the next.

There is a further need for an improved automotive water shield glued to the door panel that may be precisely placed on a vehicle door panel to improve vehicle quality.

SUMMARY

The automotive stackable water shield disclosed herein may address one or more of the issues with existing automotive water shields. The disclosure relates to a stackable, pre-glued water shield material for use in automotive applications such as, for example, door panels. The water shields are made of, at least in part, water resistant or water proof material that can be formed into a channel between inwardly angled walls.

The channel has a depth sufficient to accommodate a glue bead. The formation and shaping of the channel may be accomplished by molding techniques such as a press, or, by vacuum molding. In this way, the channel is formed in the correct portion of the water shield consistently. It is done in such a way to avoid a channel with the inwardly angled walls from slipping inside another channel with inwardly angled walls from another water shield. In this manner, the water shields are stackable without interposition of a glue protecting membrane because the glue is not exposed for interaction with other panels without action on the part of an assembly worker.

The water shield may be adapted for use with a door panel, or any other panel requiring such an arrangement. In order to achieve a desired fit with a minimal amount of labor cost, a door panel may have a complementary ridge formed therein that accommodates the channel in the water shield and permits the ridge to contact the glue in the channel, thereby securing the water shield to the panel. In this manner, the form and fit on the water shield to the panel can be easily and consistently reproduced. The adhesion of the water shield to the door panel when wet out will leave a crease in the bottom of the channel resulting in a confirmation "witness line" so the assembly worker can confirm that the adhesive is bonded all the way around the water shield. That is, gaps in the witness line indicate non-adhesion. In addition, because it is no longer necessary for a release sheet to be interposed between the stackable water shield to protect the glue bead, scrap is reduced, costs are reduced because there is no need to purchase the removable membrane to protect the glue, and the assembly area work floor is kept relatively clear of waste for this operation. In other embodiments, the water shield may be positioned on the door panel in a prearranged place, and the channel is then deformed to cause the glue to contact the door panel, thereby securing it in place without the need for ridges on the door panel.

DETAILED DESCRIPTION

Figure 1:
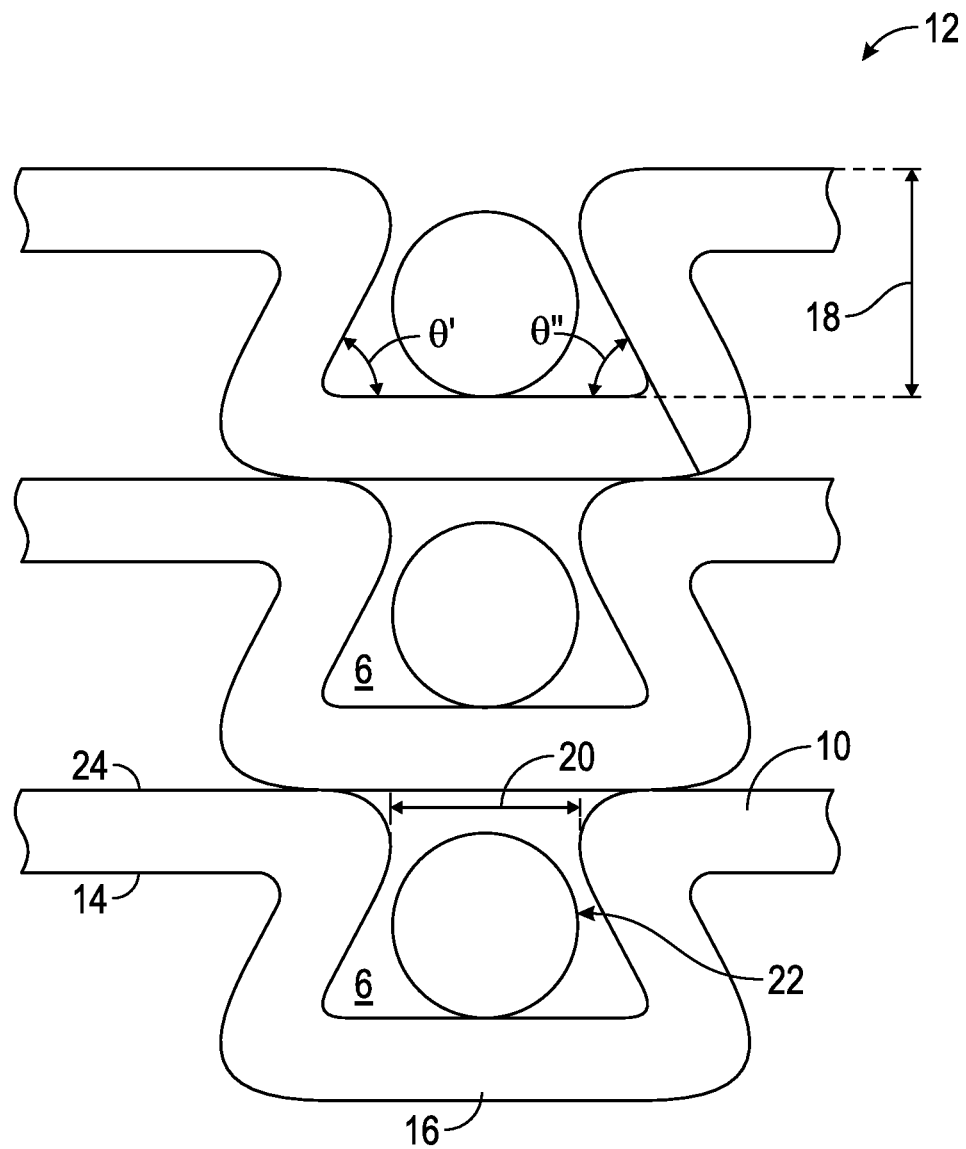
FIG. 1 is an exemplary stack of water shields with angled walls defining channels.
Figure 2:
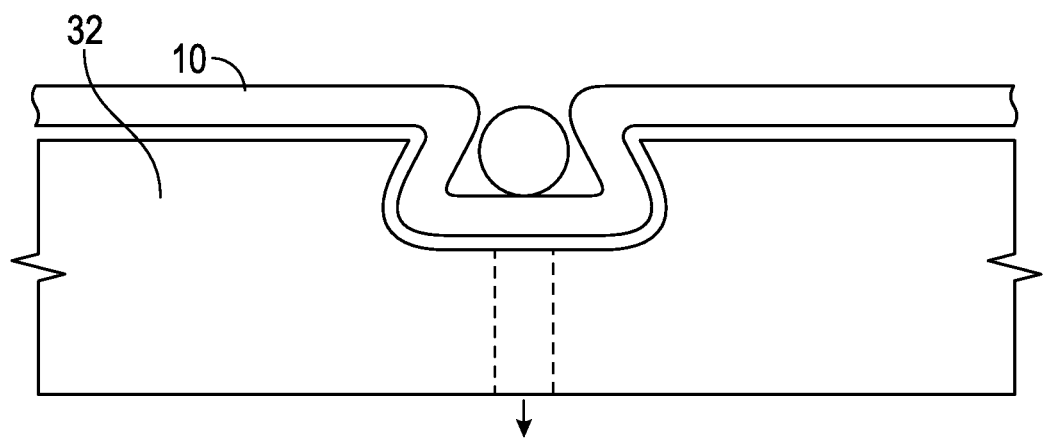
FIG. 2 is a schematic representation of an exemplary angled water shield in a vacuum mold to form the channel defined by angled walls.

Turning now to the Figures wherein like numbers refer to like structures, FIG. 1 is a detailed schematic side view representation of one embodiment of the preformed water shields 10 arranged in stack 12. The water shield 10 has a foam or plastic or other formable body portion 14, into which is formed an inwardly angled channel 6 of sufficient depth 18 and sufficient width 20 to accommodate a glue bead 22 of sufficient amount to form a secure attachment to a substrate, such as a door panel as will be described in reference to FIG. 4. The glue may be any suitable glue, including but not limited to foamed or non-foamed hot melt adhesive. Looking briefly at FIG. 2, the channel 6 is formed in this embodiment by a vacuum molding process where the body portion is placed over a mold 32 and a vacuum and heat applied thereto to cause the body portion to deform into the channel shape as depicted. The shape of channel 6 includes angles $\Theta'$ and $\Theta''$, which can be the same or different. Generally, angles $\Theta'$ and $\Theta''$ may be about 40° to about 75°. It is contemplated that the angles can be outside of that range, so so long as the shape of channel 6 formed by angles $\Theta'$ and $\Theta''$ accommodates the glue and minimizes or prevents slippage of one stacked channel into the adjacent channel. Because of the angling of the walls of channel 6, the channels 6 have wider and substantially planar bases extending between the vertexes of the angled walls than the width of the openings to prevent slippage in stacked arrangements. Angles $\Theta'$ and $\Theta''$ may each have a rounded vertex rather than a sharp vertex, due at least in part to the material comprising the water shield 10.

In the depicted embodiment, the body portion has a thickness of about 4 mm, and the channel is drawn into the vacuum mold such that the channel has a depth of about 7 mm. The channel has a width (in this case 12 mm) that is sized and shaped to accept the glue bead 22, which in this case is shown as 6 mm, with a clearance of about 1 mm on each side of the glue bead 22.

Figure 3:
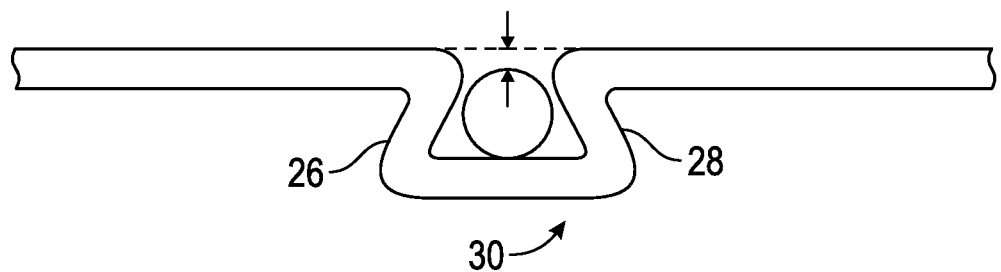
FIG. 3 is an exemplary water shield demonstrating a gap between a glue bead in one channel of a first water shield and a bottom of a second water shield atop the first.

It is important to note that any depth or width of the channel may be formed in any suitable thickness of material, provided that the glue bead 22 that is used does not extend to the wet or water-facing surface 24 of the water shield. It is also to be understood that although the channels 6 are depicted as having angled walls of at a particular angle, it is contemplated as seen in FIG. 3 that the sides 26 and 28 of the channel 6 could form a "die lock" 30 configuration as a result of the vacuum molding process. That is, the die lock 30 may be used to form angled walls within the meaning of the appended claims.

As it is apparent that the glue bead 22 does not extend to the wet surface 24 of the water shield 10, the water shields 10 may be stacked one on the other as seen in FIG. 1 without the need for a protective release sheet interposed between stacked water shields 10 to protect the glue from contact with the next sheet of water shield 10. The elimination of this release sheet eliminates labor, waste and costs associated with the sheet.

Figure 4:
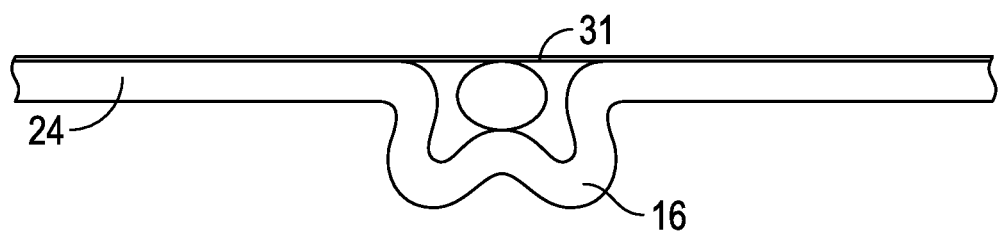
FIG. 4 is a side view of an exemplary water shield with a V-shaped crease in the channel creating a witness line to confirm adherence throughout the channel.

Additionally, as seen in FIG. 4, the wet surface 24 is placed in contact with the door panel 31 and the channel is deformed to press the glue bead into contact with the door panel thereby securing the water shield in place. The deformation into a V-shape creates a witness line. If the deformation is consistent along the length of the channel, adherence is confirmed. If there are gaps in the V-shape where the base of the channel remains substantially planar, a defect in adherence can be identified and addressed. Whatever procedure to adopted for placing the water shield 10 onto the door panel, it can be appreciated that the water shield 10 may be placed onto the door panel in an easy, accurate and reproducible way.

With regard to the processes described, it should be understood that, although the steps of such processes have been described as occurring in a certain sequence, such processes could be practiced with the described steps performed in a different order. It should be understood that certain steps could be performed simultaneously, that other steps could be added, or that certain steps could be omitted.

The entirety of the above description is intended to be merely illustrative. Many embodiments and applications other than the examples provided would be apparent upon reading the above description. The scope of the invention should be determined with reference to the appended claims along with the full scope of equivalents. It is anticipated that future developments will occur, and that the disclosed devices and processes used with such future developments. That is, the invention is capable of variation.

All terms used in the claims are intended to be given their ordinary meanings as understood by those knowledgeable in the described technologies unless an explicit indication to the contrary is made. Also, singular articles such as "a," "the," "said," should be understood to recite one or more of the indicated nouns unless a claim explicitly states otherwise.

The invention claimed is:

1. A stack of water shields without release sheets therebetween, comprising:
a bottom water shield including a water resistant material shaped to include a bottom channel with inwardly angled walls and a bottom base spanning vertexes of the angled walls and a bottom opening opposite the base such that $\Theta'$ between a first wall and the bottom base is between about 40 degrees and about 75 degrees and $\Theta''$ between a second wall and the bottom base is between about 40 degrees and about 75 degrees;
hot melt adhesive in the bottom channel;
a second water shield having a bottom surface in direct contact with a top surface of a bottom water shield, the second water shield including a water resistant material shaped to include a second channel with inwardly angled walls and a second base spanning vertexes of the angled walls and an opening opposite the second base;
hot melt adhesive in the second channel; and
the second base being over the bottom opening such that the angled walls in the bottom water shield shape the bottom channel to create a vertical clearance over the hot melt adhesive in the bottom channel sufficient to prevent the adhesive from contacting the bottom surface of the second water shield in the stack, thereby eliminating a need for a release sheet between water shields.

2. The stack of claim 1, further comprising a plurality of second water shields.

* * * * *